US008251172B2

(12) United States Patent
Inoue et al.

(10) Patent No.: US 8,251,172 B2
(45) Date of Patent: Aug. 28, 2012

(54) ELECTRIC POWER STEERING DEVICE

(75) Inventors: Hiroyasu Inoue, Kashihara (JP);
Tetsuya Ozaki, Kitakatsuragi-gun (JP)

(73) Assignee: JTEKT Corporation, Osaka-shi (JP)

( * ) Notice: Subject to any disclaimer, the term of this patent is extended or adjusted under 35 U.S.C. 154(b) by 716 days.

(21) Appl. No.: 12/364,716

(22) Filed: Feb. 3, 2009

(65) Prior Publication Data
US 2009/0200098 A1   Aug. 13, 2009

(30) Foreign Application Priority Data

Feb. 7, 2008  (JP) .................................. 2008-027839
Feb. 7, 2008  (JP) .................................. 2008-027840

(51) Int. Cl.
*B62D 5/04* (2006.01)
*B62D 6/00* (2006.01)
*H02P 7/06* (2006.01)

(52) U.S. Cl. ........................... 180/446; 318/434; 701/42
(58) Field of Classification Search ................... 180/446; 701/41, 42, 65; 318/434, 471
See application file for complete search history.

(56) References Cited

U.S. PATENT DOCUMENTS

| 4,611,682 | A  | * | 9/1986  | Yasuda et al. ................ 180/446 |
| 4,849,677 | A  | * | 7/1989  | Kruger .......................... 318/473 |
| 6,268,986 | B1 | * | 7/2001  | Kobayashi et al. ............ 361/24 |
| 6,326,753 | B1 | * | 12/2001 | Someya et al. ............... 318/471 |
| 6,860,361 | B2 | * | 3/2005  | Takatsuka et al. ............ 180/446 |
| 6,902,028 | B2 | * | 6/2005  | Takatsuka et al. ............ 180/446 |
| 7,129,660 | B2 | * | 10/2006 | Fujita et al. ................... 318/434 |
| 7,164,248 | B2 | * | 1/2007  | Hayashi ......................... 318/434 |
| 7,203,583 | B2 | * | 4/2007  | Fujimoto et al. ............... 701/41 |
| 7,730,993 | B2 | * | 6/2010  | Watanabe ..................... 180/422 |
| 7,878,512 | B2 | * | 2/2011  | Horiuchi et al. ............ 280/5.522 |
| 2005/0269150 | A1 |  | 12/2005 | Fujimoto et al. |
| 2007/0247766 | A1 |  | 10/2007 | Zeniya et al. |
| 2008/0048591 | A1 | * | 2/2008  | Hamada et al. ................... 318/9 |
| 2011/0118937 | A1 | * | 5/2011  | Kariatsumari et al. ......... 701/41 |
| 2011/0160965 | A1 | * | 6/2011  | Oh ................................. 701/42 |
| 2011/0178681 | A1 | * | 7/2011  | Gu ................................. 701/42 |

FOREIGN PATENT DOCUMENTS

| JP | 3578048 | 7/2004 |
| WO | WO 03/047950 A1 | 6/2003 |
| WO | WO 03/099634 A1 | 12/2003 |

* cited by examiner

*Primary Examiner* — Lesley D Morris
*Assistant Examiner* — Daniel Yeagley
(74) *Attorney, Agent, or Firm* — Oblon, Spivak, McClelland, Maier & Neustadt, L.L.P.

(57) ABSTRACT

In an electric power steering device, if the temperature of a specific site that increases due to the driving of a steering assist motor exceeds a threshold, the motor current is controlled to be equal to or below a current restriction value. The temperature Toff of the specific site detected when an engine is stopped, and the current restriction value Ioff provided when the engine is stopped are stored into a storage. A temperature difference Ta between the temperature detected when a starter switch is turned on and the temperature Toff is computed. If the temperature of the specific site when the starter switch is turned on is above the threshold, the current restriction value is set to be equal to or above the current restriction value Ioff stored in the storage, according to the temperature difference Ta, over a time following the turning-on of the starter switch.

9 Claims, 6 Drawing Sheets

ELECTRIC POWER STEERING DEVICE

INCORPORATION BY REFERENCE

The disclosure of Japanese Patent Applications No. 2008-27839 filed on Feb. 7, 2008, and No. 2008-27840 filed on Feb. 7, 2008, including the specification, drawings and abstract are incorporated herein by references in its entirety.

BACKGROUND OF THE INVENTION

1. Field of the Invention

The invention relates to an electric power steering device that executes a control of restraining the overheating of an electric motor provided for steering assist.

2. Description of the Related Art

An electric power steering device mounted in a vehicle includes an electric motor that is driven according to the steering torque applied to a steering member, and executes steering assist by transmitting the drive force generated by the motor to a steering mechanism of the vehicle. In such an electric power steering device, if steering is repeatedly executed, the electric current that flows through the motor or through a drive circuit that drives the motor brings about increases and decreases in the temperature of the motor or the drive circuit, and thus the motor or the drive circuit produces heat. Then, if the motor or the drive circuit overheats, there is a risk of occurrence of a trouble, such as a malfunction, a damaged component part, etc. In order to prevent the trouble caused by overheating, the related-art electric power steering device, for example, is provided with a temperature detector on a board where a control portion and the drive circuit are packaged, and thereby detects the temperature of the board. In the case where the temperature detected by the temperature detector exceeds a permissible temperature, the current supplied to the motor is restricted to or below a threshold value. Besides, the threshold value for restricting the current is increased or decreased according to the temperature of the motor or the drive circuit that corresponds to the history of steering. The threshold value is lowered when the temperature of the motor or the drive circuit becomes high, so that when the temperature of the circuit board becomes equal to or higher than the permissible temperature, a current restricted to or below the threshold value is supplied to the board or the motor. In consequence, further increases in temperature of various component parts on the board and of the motor are prevented, and therefore troubles caused by overheating are prevented.

In the electric power steering device that restricts current as described above, if the engine has been at rest for a long time, the temperature of the board disconnected from the supply of electric power sufficiently declines. Therefore, there is no need to execute a control of restricting current immediately after a starter switch for starting the engine is turned on. However, in the case where after the engine stops, the starter switch is turned on before the temperature of the board declines, there is a need to execute a control of restricting current immediately after the turning-on of the starter switch. Besides, generally in the electric power steering device, the board and the motor are provided apart from each other, so that there is a need to estimate the temperature of the motor from the temperature of the board.

Japanese Patent No. 3578048 proposes an electric power steering device in which, when the starter switch is turned off, the electric power supply to an electric power source unit that drives and controls the motor is discontinued, and then an electric power source is turned on, the temperature of the motor is estimated, and a control of restricting current is executed. The electric power steering device described in Japanese Patent No. 3578048 directly detects the temperature of a specific site in an electric control unit that drives and controls the motor, and estimates the temperature of the motor on the basis of a cooling time obtained from a detected temperature value, as well as cooling characteristics of the electric control unit and the motor. Then, on the basis of the estimated temperature of the motor, the control of restricting current to or below the set threshold value.

However, when the engine is at rest, the current to the steering-assist motor is discontinued, the temperature of the specific site in the electric control unit decreases to some extent during the off-state, whether the duration of the off-state is long or short. Therefore, in the above Japanese Patent No. 3578048 in which the temperature of the engine is estimated, and current is restricted on the basis of the estimated temperature, if an estimated temperature of the motor is lower than the actual temperature thereof, the current is less frequently restricted, and it can happen that although it becomes necessary to restrict the current, the current is not restricted, and the temperature of the motor or the electric control unit may possibly further increase. In consequence, there is a risk of occurrence of a trouble due to overheating. On the other hand, in the case where an estimated temperature of the motor is higher than the actual temperature thereof, there is a possibility of restricting the current when the current actually does not need to be restricted. Therefore, the electric power steering device of Japanese Patent No. 3578048 has a problem of the steering feel of a steering member changing dependently on the foregoing estimated temperature after the starter switch is turned on.

SUMMARY OF THE INVENTION

The invention provides an electric power steering device that is capable of avoiding the deterioration of the steering feel of a steering member by deterring the unnecessary restriction of electric current, and is also capable of restricting current more safely and therefore preventing the occurrence of a trouble due to overheating.

An electric power steering device in accordance with a first aspect of the invention includes: a motor for steering assist that is supplied with a current in accordance with a steering torque applied to a steering member; a temperature detection portion that detects temperature of a specific site whose temperature increases due to driving of the motor; a control portion that controls the current to be equal to or less than a restriction value that is changed according to the temperature of the specific site, if the temperature detected by the temperature detection portion exceeds a threshold temperature; a temperature value storage portion that stores the temperature of the specific site when an engine is stopped; a restriction value storage portion that stores the restriction value provided when the engine is stopped, as a pre-stop restriction value; a computation portion that computes a temperature difference between the temperature of the specific site detected when a starter switch for starting the engine is turned on and the temperature stored when the engine is stopped; and a setting portion that sets the restriction value to be equal to or greater than the pre-stop restriction value stored in the restriction value storage portion, according to the temperature difference computed by the computation portion, over a predetermined time following a time of turning-on of the starter switch, if the temperature of the specific site at the time of the turning-on of the starter switch is above the threshold temperature.

Therefore, even in the case where the temperature of a specific site detected or estimated at the time of the turning-on of the starter switch is higher than a threshold temperature, the setting of the restriction value at a high value will prevent the current from being restricted to an extent that is equal to or greater than the extent of the current restriction prior to the stop of the engine since the temperature of the specific site has become lower to some extent than the temperature thereof occurring prior to the stop. In consequence, when the starter switch is turned on, unnecessary restriction of the current can be deterred, so that deterioration of the steering feel of the steering member can be avoided.

The duration during which the engine was at rest, that is, a cooling period, can be estimated by using a temperature difference and, for example, a cooling characteristic of the specific site. Then, if the estimated engine stop duration is short, the restriction value is set to the pre-stop restriction value that is a minimum value within the range of the set value, whereby it becomes possible to prevent an undesired event that the restriction value is set at a value that is higher than necessary, and therefore necessary restriction of the current is not executed.

In the electric power steering device in accordance with the first aspect, the setting portion may include: a first setting portion that sets the restriction value to the pre-stop restriction value if the temperature difference computed by the computation portion is less than a first threshold value; a second setting portion that sets the restriction value to a value obtained by adding a predetermined value to the pre-stop restriction value if the temperature difference computed by the computation portion is equal to or greater than the first threshold value, and less than a second threshold value; and a third setting portion that sets the restriction value to an upper-limit value if the temperature difference computed by the computation portion is equal to or greater than the second threshold value.

In the case where the restriction value is set to a value that is higher than necessary, necessary restriction of the current will be missed. Therefore, by setting the restriction value to be high stepwise on the basis of the temperature difference, the restriction of the current can be appropriately executed, and unnecessary restriction of the current can be deterred.

Furthermore, the electric power steering device in accordance with the first aspect may further include: an outside-air temperature detection portion that detects outside-air temperature; and a determination portion that determines the first threshold value and/or the second threshold value based on the outside-air temperature detected by the outside-air temperature detection portion.

In the case where the outside-air temperature is low or the case where it is high, the temperature of the specific site during a stop of the engine changes according to the outside-air temperature. Therefore, if the threshold values for setting the restriction values are set on the basis of the outside-air temperature, the current can be appropriately restricted.

An electric power steering device in accordance with a second aspect of the invention includes: a motor for steering assist that is supplied with a current in accordance with a steering torque applied to a steering member; a temperature detection portion that detects temperature of a specific site whose temperature increases due to driving of the motor; a control portion that controls the current to be equal to or less than a restriction value that is changed according to the temperature of the specific site, if the temperature detected by the temperature detection portion exceeds a threshold temperature; a storage portion that stores the restriction value provided when an engine is stopped, as a pre-stop restriction value; a determination portion that determines a temperature correction value that corrects the temperature of the specific site detected, based on the pre-stop restriction value stored in the storage portion, when the starter switch for starting the engine is turned on; and a temperature value setting portion that sets a temperature value obtained by adding the temperature correction value to the temperature of the specific site detected at a time of turning-on of the starter switch, as the temperature of the specific site, over a predetermined time following the turning-on of the starter switch.

Since the restriction value is changed according to the temperature of the specific site, the temperature of the specific site before the engine is stopped can be estimated from the restriction value set prior to the stop of the engine. The temperature correction value is determined by taking into consideration the temperature of the specific site occurring prior to the stop of the engine. Therefore, even in the case where the temperature of the specific site is set to be higher by adding thereto the temperature correction value when the starter switch is turned on, the set or corrected value of the temperature of the specific site can be prevented from becoming higher than necessary. In consequence, even in the case where the detected temperature is not equal to the actual temperature of the motor, unnecessary restriction of the current can be prevented on the basis of the temperature value that is set appropriately high, and, at the same time, the current can be more safely controlled, and the trouble caused by overheating can be certainly prevented.

Besides, when the temperature of the motor is estimated, the estimated temperature is equal to the actual temperature of the motor in some cases, and, in some other cases, the estimated temperature is higher than the actual motor temperature, or lower than the actual temperature. However, if a temperature value that is higher than the detected temperature of the specific site is set so that the restriction of the current is more likely to be executed, the trouble caused by overheating can be prevented more certainly than in the case where the temperature of the specific site is estimated.

Besides, the electric power steering device in accordance with the second aspect may further include a gradual decrease portion that gradually decreases the temperature correction value as time elapses after the starter switch is turned on.

This construction will reduce the likelihood of the steering assist force of the motor becoming insufficient due to unnecessary restriction of the current.

Furthermore, the electric power steering device in accordance with the second aspect may further include: an outside-air temperature detection portion that detects outside-air temperature; and a correction portion that corrects the temperature correction value and/or the temperature value set by the temperature value setting portion, based on the outside-air temperature detected.

When the outside-air temperature is low, the site whose temperature increases due to the driving of the motor relatively rapidly undergoes a decrease in temperature. Therefore, the correction of the temperature in accordance with the outside-air temperature will achieve appropriate restriction of the current.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein.

DETAILED DESCRIPTION OF EMBODIMENTS

Hereinafter, the invention will be described in detail with reference to the drawings that show embodiments of the invention.

Figure 1:
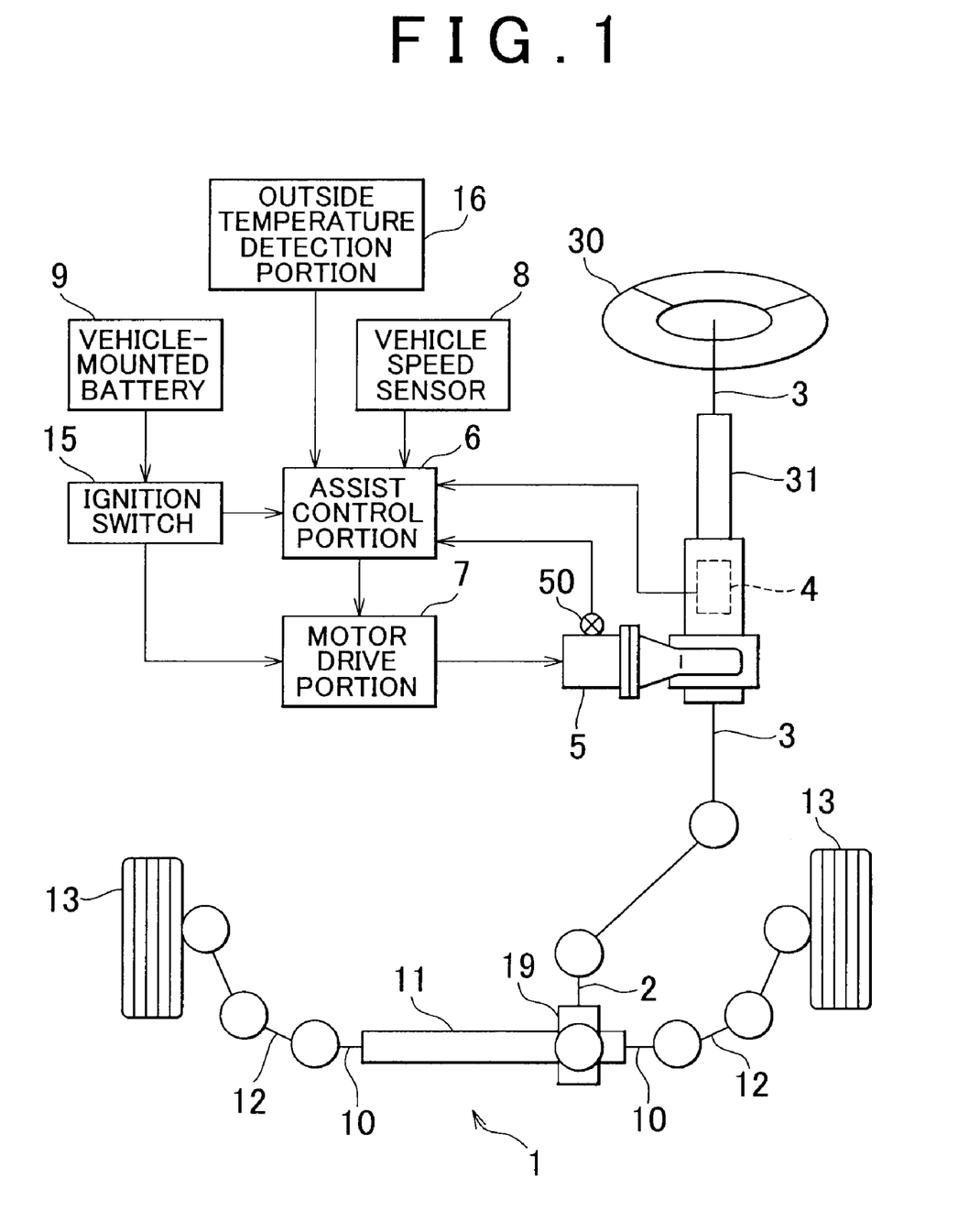
FIG. 1 is a schematic diagram showing a construction of an electric power steering device in accordance with a first embodiment of the invention.

FIG. 1 is a schematic diagram showing a construction of an electric power steering device in accordance with the first embodiment. The electric power steering device includes a rack-and-pinion type steer device 1. The steer device 1 has a rack shaft 10 that is supported freely movably in the direction of the length of the shaft within a rack housing 11 extending in a vehicle (not shown) width direction, and a pinion shaft 2 that is freely rotatably supported within a pinion housing 19 that intersect with an intermediate portion of the rack housing 11.

Two opposite ends of the rack shaft 10 protruded out of two sides of the rack housing 11 are linked to left and right front wheels 13, 13 as steering road wheels via tie rods 12, 12, respectively. An upper end of the pinion shaft 2 protruded out of the pinion housing 19 is linked to a steering wheel 30 as a steering member, via a steering shaft 3. On a lower portion of the pinion shaft 2 extending within the pinion housing 19, a pinion (not shown) is formed integrally therewith. The pinion, at a portion intersecting with the rack housing 11, is in mesh with a rack portion that is formed over an appropriate length on an intermediate portion of the rack shaft 10.

The steering shaft 3 is freely rotatably supported within a housing 31 that has a cylindrical shape, and is attached, via the housing 31, to an interior of the vehicle cabin (not shown) in an inclined posture in which a forward portion of the steering shaft 3 is lower. The pinion shaft 2 is linked to a lower end of the steering shaft 3 protruded downward from the housing 31. The steering wheel 30 is fixed to an upper end of the steering shaft 3 protruded upward from the housing 31.

Due to the foregoing construction, the steering shaft 3 is rotated by a rotating operation of the steering wheel 30 provided for steering, and the rotation of the steering shaft 3 is transmitted to the pinion shaft 2, and the rotation of the pinion shaft 2 is converted into movement of the rack shaft 10 in the direction of the length of the rack shaft 10, at the site of mesh between the pinion and the rack. Such movement of the rack shaft 10 is transmitted to the left and right front wheels 13, 13 via tie rods 12, 12, respectively. Steer operation is thus executed.

An intermediate portion of the housing 31 that supports the steering shaft 3 is provided with a torque sensor 4 that detects the steering torque applied to the steering shaft 3 by the rotating operation of the steering wheel 30. At a position below the torque sensor 4, a motor 5 for steering assist is attached.

The steering assist motor 5 is attached to the outside of the housing 31, with its axis being substantially orthogonal to the housing 31. The motor 5 is provided with a construction in which, for example, a worm gear (not shown) fixed to an output shaft of the motor 5 that extends into the housing 31 is meshed with a worm wheel (not shown) that is securely fitted onto the steering shaft 3 in such a fashion that the rotation of the motor 5 is transmitted to the steering shaft 3 while the rotation speed is reduced by the worm gear and the worm wheel. The steering assist motor 5 assists in the steer executed as described above. A motor drive portion 7 that drives and controls the motor 5 is connected to the motor 5.

The motor drive portion 7 is connected to a vehicle-mounted battery 9, via an ignition switch (hereinafter, termed the IG switch) 15, and is supplied with electric power from the vehicle-mounted battery 9. Besides, the motor drive portion 7 is also connected to an assist control portion 6, and is given a PWM signal from the assist control portion 6, and then the motor 5 is driven in a PWM mode. The assist control portion 6, similar to the motor drive portion 7, is connected to the vehicle-mounted battery 9 via the IG switch 15, and is supplied with electric power from the vehicle-mounted battery 9.

Incidentally, the IG switch 15 is an engine-starting starter switch that starts the engine when turned on. In this embodiment, when the IG switch 15 is turned off, the engine stops, and the electric power to the assist control portion 6 and the motor drive portion 7 is discontinued.

Figure 2:
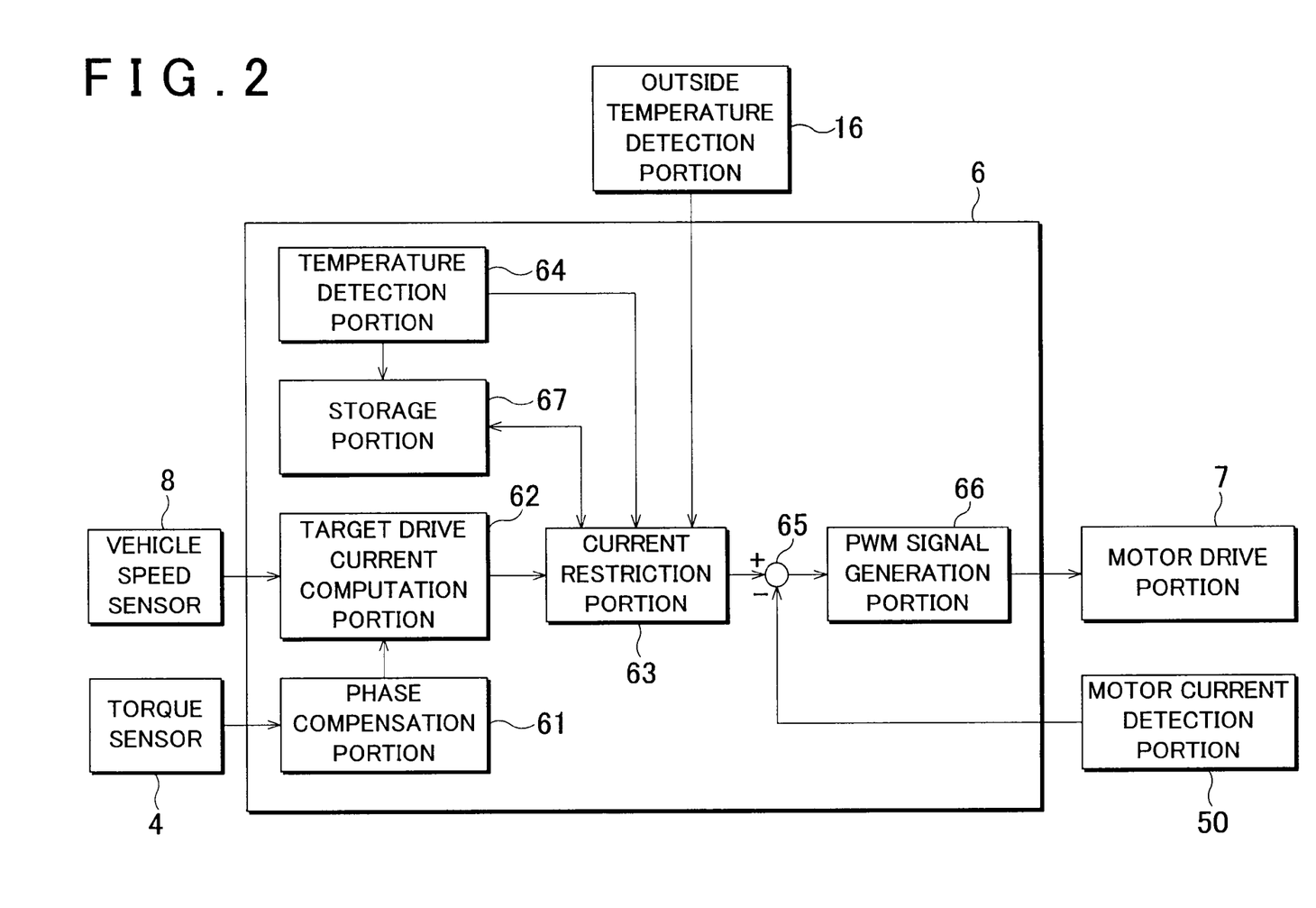
FIG. 2 is a block diagram showing a construction of an assist control portion in the first embodiment of the invention.

FIG. 2 is a block diagram showing a construction of the assist control portion 6. The assist control portion 6 includes a CPU (Central Processing Unit), a ROM (Read-Only Memory) and a RAM (Random Access Memory), and is constructed so as to execute the controls (described below) of various portions through operations of the CPU in accordance with control programs stored in the ROM. The assist control portion 6 is constructed so as to receive inputs of a steering torque value detected by the torque sensor 4, a vehicle speed value detected by a vehicle speed sensor 8, a motor current value detected by a motor current detection portion 50, and an outside-air temperature detected by an outside-air temperature detection portion 16.

The assist control portion 6 has a phase compensation portion 61, a target drive current computation portion 62, a current restriction portion 63, a temperature detection portion 64, a subtracter 65, a PWM signal generation portion 66, and a storage portion 67. The phase compensation portion 61 is given a steering torque value from the torque sensor 4. The phase compensation portion 61 executes a phase compensation process of, for example, advancing the phase relative to the steering torque value given from the torque sensor 4, in order to stabilize the control system. The phase compensation portion 61 gives the steering torque value obtained through the phase compensation process to the target drive current computation portion 62. Besides, the target drive current computation portion 62 is given a vehicle speed value from the vehicle speed sensor 8.

The target drive current computation portion 62 has an assist control map (not shown) that shows a relation between the steering torque value and the target drive current value. The target drive current computation portion 62 computes a target drive current value by applying the steering torque value given from the torque sensor 4 to this assist control map, and then gives the thus-computed target drive current value to the current restriction portion 63. The target drive current value is a motor current value that the motor 5 needs in order to generate an assist force needed for the steering assist. In addition, the assist control map is provided separately for each of vehicle speed values. The target drive current computation portion 62 is constructed so as to select one of the assist control maps that corresponds to a given vehicle speed value, and so as to compute a target drive current value on the basis of the selected assist control map.

The temperature detection portion 64 is connected to the current restriction portion 63. The temperature detection portion 64 is, for example, a thermistor provided on a circuit board that constitutes the assist control portion 6, and is a temperature sensor that detects the temperature T occurring in the assist control portion 6. The current restriction portion 63 is given the temperature in the assist control portion 6 from the temperature detection portion 64. In the case where the temperature given to the current restriction portion 63 exceeds a pre-set threshold temperature stored in, for example, the ROM, the current restriction portion 63 restricts the target drive current value computed by the target drive current computation portion 62 so that target drive current value becomes equal to or less than a current restriction value.

The current restriction value is a threshold value that is used to restrict the motor current supplied to the motor 5, and has an upper-limit value. The current restriction value is decreased or increased according to the steering history of the steering wheel 30. The steering history is a history of the operation of the steering wheel 30, and is stored in storage means, such as the RAM or the like, at any time.

In the case where the steering wheel 30 is frequently operated, for example, at the time of garage parking, the motor 5 is supplied with the motor current, so that the temperature of the motor 5 increases or the temperature of the assist control portion 6 increases due to the driving of the motor 5. Therefore, by restricting the motor current supplied to the motor 5, the overheating of the motor 5 or the assist control portion 6 can be prevented.

The storage portion 67 is connected to the current restriction portion 63, and the current restriction value is stored into the storage portion 67. The storage portion 67 is, for example, an EEPROM (Electrically Erasable and Programmable Read-Only Memory), and is connected to the temperature detection portion 64 as well as the current restriction portion 63. The storage portion 67 stores the temperature detected by the temperature detection portion 64, and the current restriction value having been used in the current restriction portion 63 to restrict the motor current, in a non-volatile storage fashion. The storage portion 67 stores the temperature and the current restriction value without receiving the supply of electric power. Therefore, the storage portion 67 retains the stored various data even after the IG switch 15 is turned off and the engine has stopped. Incidentally, the storage portion 67 is not limited to an EEPROM, but may also be a static RAM, or a flash memory, or may also be any other storage medium as long as the stored content is not erased even when the IG switch 15 is in the off-state. The current restriction value and the temperature stored in the storage portion 67 are read by the current restriction portion 63. In the description below, the current restriction value stored in the storage portion 67 will be referred to as "current restriction value Ioff", and the temperature stored will be referred to as "temperature Toff".

Besides, the current restriction portion 63 computes a temperature difference Ta between the temperature T detected by the temperature detection portion 64 and the temperature Toff stored in the storage portion 67. Besides, the current restriction portion 63 is connected to the outside-air temperature detection portion 16, and is given the outside-air temperature that the outside-air temperature detection portion 16 detects.

The current restriction portion 63 sets a current restriction value on the basis of the computed temperature difference Ta and the outside-air temperature, for a predetermined time following the turning-on of the IG switch 15. Then, if the temperature T detected by the temperature detection portion 64 exceeds the threshold temperature, the current restriction portion 63 restricts the target drive current value computed by the target drive current computation portion 62 to become equal to or less than the current restriction value set on the basis of the temperature difference Ta and the outside-air temperature. In the description below, the current restriction value that the current restriction portion 63 sets for the predetermined time after the IG switch 15 is turned on will be referred to as "current restriction value Ion".

The subtracter 65 is also given the motor current value that is output by the motor current detection portion 50 that detects the current flowing through the motor 5. The subtracter 65 finds a deviation between the motor current and the target drive current value, which is the output value of the target drive current computation portion 62, (the current restriction value in the case where the target drive current value is restricted by the current restriction portion 63), and then gives this deviation to the PWM signal generation portion 66. The PWM signal generation portion 66 generates a PWM signal on the basis of the deviation given from the subtracter 65, and gives the generated PWM signal to the motor drive portion 7. Then, the motor drive portion 7 performs the PWM driving of the motor 5 by switching between the connection of each phase coil (not shown) with the electric power source and the connection of each phase coil with the grounding terminal.

The assist control portion 6 constructed as described above generates the PWM signal of the target drive current value that generates the motor current that the motor 5 needs in order to assist steering. At the same time, if the temperature of the assist control portion 6 increases to or above a predetermined temperature, the assist control portion 6 prevents the overheating of the assist control portion 6 by controlling the target drive current value so that the target drive current value becomes equal to or less than the current restriction value.

Figure 3:
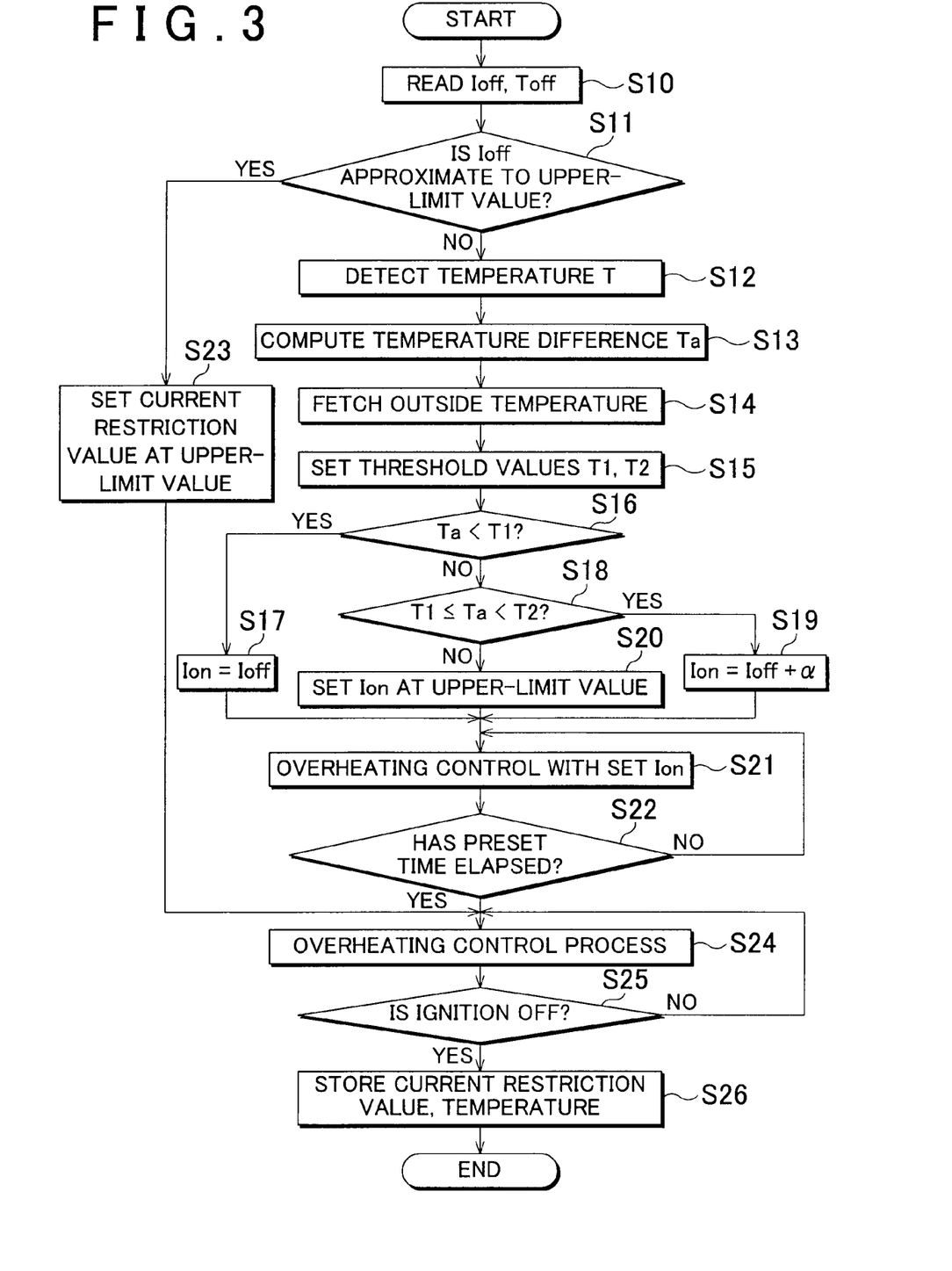
FIG. 3 is a flowchart for describing an operation that the assist control portion of the first embodiment executes.

Next, an operation that the assist control portion 6 executes will be described. FIG. 3 is a flowchart for describing the operation that the assist control portion 6 executes.

In the case where the IG switch 15 is on and the temperature of the specific site is greater than the threshold temperature, the assist control portion 6 starts the operation shown in FIG. 3, and reads the current restriction value Ioff and the temperature Toff that are stored in the storage portion 67 (S10). The current restriction value Ioff, and the temperature Toff are stored in the storage portion 67 before the IG switch 15 is turned off. Then, the assist control portion 6 determines whether or not the current restriction value Ioff is approximate to the upper-limit value (S11). It is to be noted herein that the range of the approximation to the upper-limit value is not particularly limited, but can be suitably changed.

If the current restriction value Ioff is not approximate to the upper-limit value (NO in S11), the assist control portion 6 detects the temperature T occurring in the assist control portion 6 by the temperature detection portion 64 (S12). Then, the assist control portion 6 computes the temperature difference Ta between the temperature Toff occurring therein prior to the turning-off of the IG switch 15 and the temperature T occurring after the turning-on of the IG switch 15 (S13). Concretely, the temperature difference Ta is computed as in an expression Toff-T. Using the computed temperature difference Ta, the assist control portion 6 determines the duration of the off-state of the IG switch 15. For example, if the temperature difference is small, it is determined that the duration of the off-state was short. On the other hand, if the temperature difference is large, it is determined that the duration of the off-state was long.

Next, the assist control portion 6 fetches the outside-air temperature from the outside-air temperature detection portion 16 (S14), and then sets the threshold values T1 and T2 (S15). Each of the threshold values T1 and T2 is a threshold value for determining the magnitude of the temperature difference Ta computed in S13. By determining the magnitude of the temperature difference Ta with reference to the threshold values, the length of the duration of the off-state of the IG switch 15 is determined. The temperature difference Ta changes according to the outside-air temperature. For example, in the case where the outside-air temperature is low, the temperature difference Ta is large. In the case where the outside-air temperature is high, the temperature difference Ta is small. Therefore, the threshold values T1 and T2 used in determining the magnitude of the temperature difference Ta are set according to the outside-air temperature.

Subsequently, the assist control portion 6 determines in the current restriction portion 63 whether or not the temperature difference Ta is less than the threshold value T1 (S16). If the temperature difference Ta is less than the threshold value T1 (YES in S16), the assist control portion 6 determines that the duration of the off-state of the IG switch 15 was short, and then sets the current restriction value Ion to the current restriction value Ioff (S17). That is, for a predetermined time following the turning-on of the IG switch 15, the assist control portion 6 executes the restriction of the motor current by using the current restriction value Ioff set prior to the turning-off of the IG switch 15. Subsequently, the assist control portion 6 proceeds to S21.

On the other hand, if the temperature difference Ta is not less than the threshold value T1 (NO in S16), the assist control portion 6 determines whether or not the temperature difference Ta is equal to or greater than the threshold value T1, and less than the threshold value T2 (S18). If the temperature difference Ta is equal to or greater than the threshold value T1, and less than the threshold value T2 (YES in S18), the assist control portion 6 sets the current restriction value Ion to a value above the current restriction value Ioff which is obtained by adding a predetermined value α to the current restriction value Ioff (S19). After that, the assist control portion 6 proceeds to S21.

Besides, if it is not that the temperature difference Ta is equal to or greater than the threshold value T1, and less than the threshold value T2 (NO in S18), the assist control portion 6 determines whether or not the duration of the off-state of the IG switch 15 was long, and then sets the current restriction value Ion to the upper-limit value (S20). After that, the assist control portion 6 proceeds to S21.

In S21, the assist control portion 6 executes the overheat control on the basis of the current restriction value Ion set in S17, S19 or S20. Then, the assist control portion 6 determines whether or not a predetermined time has elapsed following the turning-on of the IG switch 15 (S22). If the predetermined time has not elapsed (NO in S22), the assist control portion 6 returns to S21, in which the assist control portion 6 executes the overheat control on the basis of the current restriction value Ion set in S17, S19 or S20. Concretely, in the case where the temperature T detected by the temperature detection portion 64 is higher than the threshold temperature and where the target drive current value computed from various values, such as the vehicle speed value, the steering torque value, etc., by the target drive current computation portion 62 is greater than the current restriction value Ion, the assist control portion 6 controls the target drive current value so that the target drive current value becomes equal to or less than current restriction value Ion. Then, on the basis of a result of the control, the assist control portion 6 generates a PWM signal to be given to the motor drive portion 7. Besides, in the case where the temperature T is not above the threshold temperature or the case where the target drive current value is not above the current restriction value Ion, the assist control portion 6 generates a PWM signal on the basis of the target drive current value computed by the target drive current computation portion 62.

Thus, for the predetermined time following the turning-on of the IG switch 15, the assist control portion 6 restricts the motor current by using the current restriction value Ion that is set at or above the current restriction value Ioff on the basis of the magnitude of the temperature difference Ta. Therefore, the motor current is not restricted to an extent that is equal to or greater than the extent of the current restriction prior to the turning-off of the IG switch 15, and it is possible to prevent a situation in which an unnecessary restriction of the motor current is carried out, resulting in an insufficient steering force.

In the case where the predetermined time has elapsed (YES in S22), the assist control portion 6 proceeds to S24. On the other hand, in the case where in S11, the current restriction value Ioff is approximate to the upper-limit value (YES in S11), the assist control portion 6 determines that the restriction of the motor current was scarcely executed before the IG switch 15 was turned off. Then, the assist control portion 6 sets the current restriction value subsequent to the turning-on of the IG switch 15, to the upper-limit value (S23). After that, the assist control portion 6 proceeds to S24.

In S24, the assist control portion 6 executes an overheat control process (S24). In the overheat control process herein, if the temperature T detected by the temperature detection portion 64 exceeds the threshold temperature, the assist control portion 6 prevents the overheating of the assist control portion 6 or the motor 5 by executing a control of restricting the motor current on the basis of the current restriction value set at the upper-limit value in S23, or the current restriction value set according to the steering history.

Next, the assist control portion 6 determines whether or not the IG switch 15 has been turned off (S25). If the IG switch has not been turned off (NO in S25), the assist control portion 6 repeats the overheat control process in S24. On the other hand, if the IG switch 15 has been turned off (YES in S25), the assist control portion 6 stores the current restriction value used in the overheat control process of S24, and temperature T detected by the temperature detection portion 64 into the storage portion 67 (S26), and then ends the operation process shown in FIG. 3. Incidentally, after the IG switch 15 is turned off, the complete shut-off of electric power is delayed, for example, by employing a timer or a relay, until the current restriction value and the temperature are stored into the storage portion 67.

The current restriction value and the temperature stored in S26 are read when the IG switch 15 is turned on, and are used in the computation of the temperature difference Ta, and the setting of the current restriction value Ion.

As described above, in the first embodiment, the assist control portion 6 computes the difference between the temperature in the assist control portion 6 prior to the turning-off of the IG switch 15 and the temperature therein subsequent to the turning-on of the IG switch 15, and, according to the computed temperature difference, sets the current restriction value Ion to be equal to or greater than the current restriction value Ioff occurring prior to the turning-off. This deters the unnecessary restriction of current, so that deterioration of the steering feel of a steering member can be avoided.

Incidentally, in the first embodiment, the assist control portion 6 has the temperature detection portion 64, and determines a temperature correction value on the basis of the temperature in the assist control portion 6 detected by the temperature detection portion 64. However, it is also permissible to detect the temperature of a site that produces heat due to the driving of the motor 5, such as the motor drive portion 7, the motor 5, etc., and to determine the temperature correction value on the basis of the detected temperature of the site.

Besides, in the first embodiment, the timing at which the current restriction value is stored into the storage portion 67 is when the IG switch 15 is turned off. However, the current restriction value may also be stored into the storage portion 67 every time the current restriction portion 63 lowers the current restriction value on the basis of the steering history, that is, every time the current restriction value changes. Besides, the current restriction value may also be stored into the storage portion 67 every time the temperature detected by the temperature detection portion 64 changes. In this case, the electric power supplied to the assist control portion 6 can be shut off simultaneously with the turning-off of the IG switch 15, so that there is no longer a need to install a relay for providing a time lag that allows the current restriction value or the temperature to be stored after the IG switch 15 is turned off.

Next, a second embodiment of the invention will be described. The construction of an electric power steering device in accordance with the second embodiment is the same as the construction shown in FIG. 1. In the second embodiment, the construction of an assist control portion 106 is different from that of the assist control portion 6 provided in the first embodiment. In the assist control portion 106 in the second embodiment, the same elements as those in the first embodiment are represented by the same reference characters, and descriptions thereof are omitted below.

Figure 4:
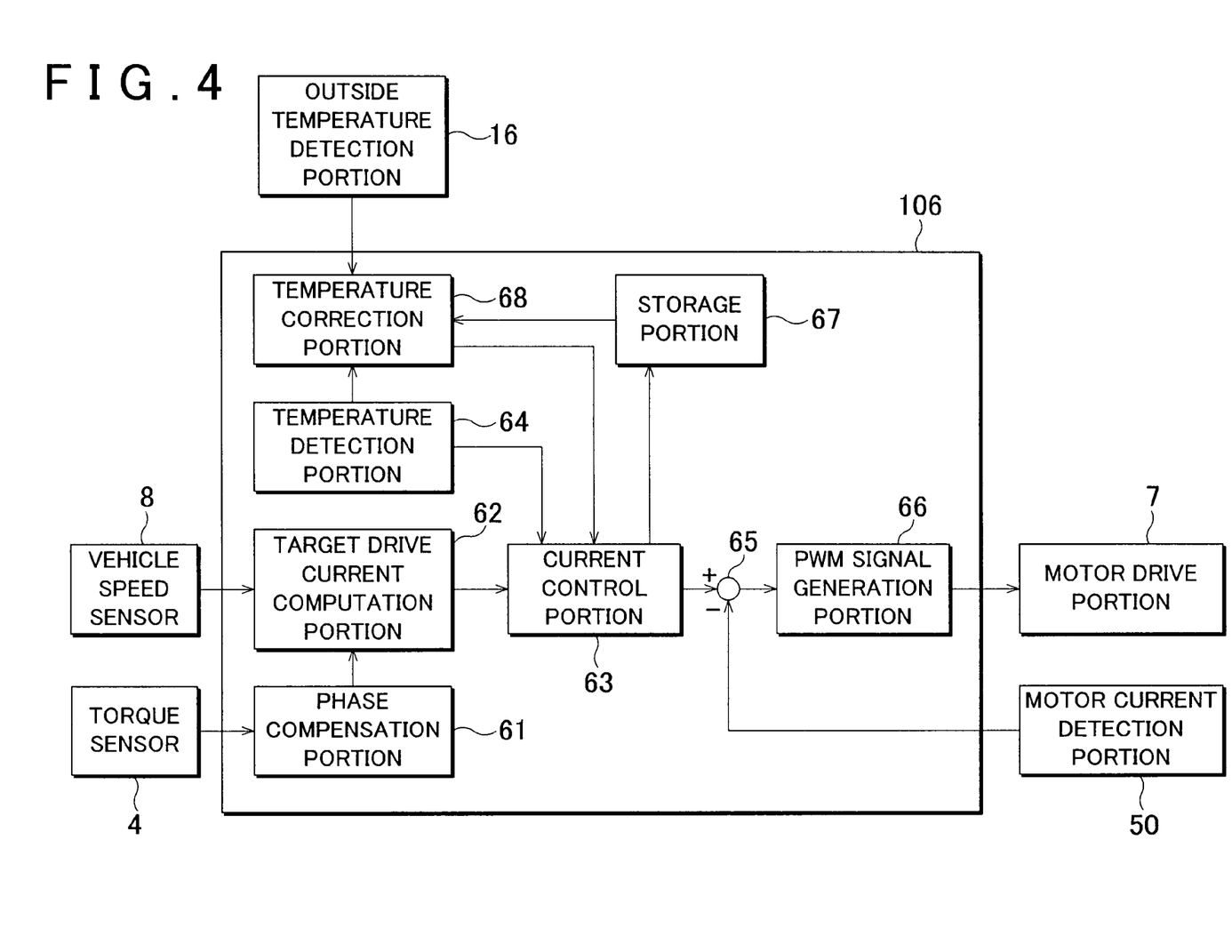
FIG. 4 is a block diagram showing a construction of another assist control portion.

As shown in FIG. 4, in the second embodiment, also a temperature correction portion 68 is connected to a current restriction portion 63. The temperature in the assist control portion 106, or a corrected temperature in the assist control portion 106 is given to the current control portion 63 from a temperature detection portion 64 or the temperature correction portion 68. In the case where the temperature given to the current restriction portion 63 exceeds a pre-set threshold temperature stored in, for example, the ROM, the current restriction portion 63 restricts the target drive current value computed by a target drive current computation portion 62 so that the target drive current value becomes equal to or less than a current restriction value.

A storage portion 67 is connected to the current restriction portion 63, and the current restriction value is stored in the storage portion 67. The storage portion 67 is, for example, an EEPROM (Electrically Erasable and Programmable Read-Only Memory), and stores the current restriction value having been used in the current restriction portion 63 to restrict the motor current, in a non-volatile storage fashion. The storage portion 67 stores the temperature and the current restriction value without receiving the supply of electric power. Therefore, the current restriction value is stored in the storage portion 67 even while the IG switch 15 is off. Incidentally, the storage portion 67 is not limited to an EEPROM, but may also be a static RAM, or a flash memory, or may also be any other storage medium as long as the stored content is not erased even when the IG switch 15 is in the off-state. The current restriction value stored in the storage portion 67 is read by the temperature correction portion 68. In the description below, the current restriction value stored in the storage portion 67 will be referred to as "current restriction value Ioff".

The temperature detection portion 64 is, for example, a thermistor provided on a circuit board that constitutes the assist control portion 106, and is a temperature sensor that detects the temperature T occurring in the assist control portion 106. The temperature T that the temperature detection portion 64 detects is given to the current restriction portion 63 or the temperature correction portion 68. Besides, the temperature correction portion 68 is connected to an outside-air temperature detection portion 16, and is given the outside-air temperature that the outside-air temperature detection portion 16 detects.

Figure 5:
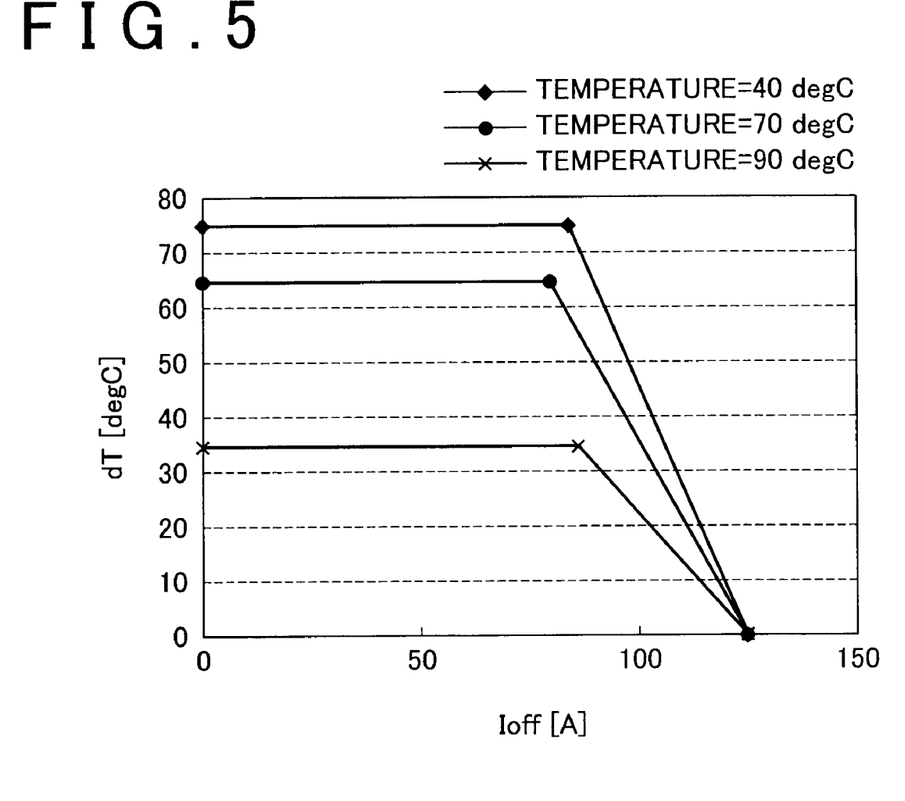
FIG. 5 is a diagram showing an example of a map that determines a temperature correction value from the current restriction value and the outside-air temperature.
Figure 6:
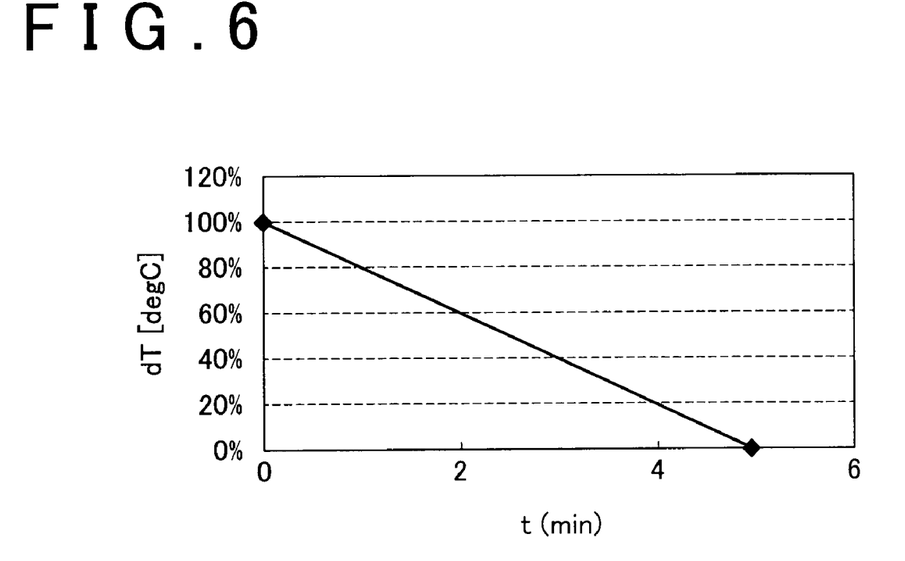
FIG. 6 is a diagram showing an example of a map that determines a temperature correction value from the elapsed time.

The temperature correction portion 68 has temperature-correcting maps shown in FIGS. 5 and 6, and determines a temperature correction value dT by applying to these maps the current restriction value Ioff read from the storage portion 67 and the outside-air temperature detected by the outside-air temperature detection portion 16. The temperature correction value dT is a correction value for setting the temperature T detected by the temperature detection portion 64 immediately following the turning-on of the IG switch 15 to be higher than the detected value of the temperature. Then, the temperature correction portion 68 adds the computed temperature correction value dT to the temperature detected by the temperature detection portion 64, and gives the result of the addition to the current restriction portion 63.

Next, the correcting map that the assist control portion 106 uses to execute the temperature correction in the temperature correction portion 68 will be described. FIG. 5 is a diagram showing an example of a map that determines the temperature correction value dT from the current restriction value and the outside-air temperature. FIG. 6 is a diagram showing an example of a map that determines the temperature correction value dT from the elapsed time. These maps may be stored in the ROM of the assist control portion 106, or may also be stored in storage means in the temperature correction portion 68.

The map shown in FIG. 5 associates the current restriction value Ioff and the temperature correction value dT stored in the storage portion 67 with each one of outside-air temperatures in correspondence. When the IG switch 15 is turned on, the temperature correction portion 68 refers to the map shown in FIG. 5, and acquires a temperature correction value dT that corresponds to the outside-air temperature detected by the outside-air temperature detection portion 16 and the current restriction value Ioff read from the storage portion 67. Thus, the temperature correction value dT is determined on the basis of the current restriction value Ioff set before the IG switch 15 is turned off.

In the case where steering is frequently executed so that restriction of the motor current is needed, the current restriction value is lowered. Therefore, the map of FIG. 5 is formed so that when the current restriction value Ioff prior to the turning-off of the IG switch 15 is low, the temperature correction value dT is set high and, therefore, the temperature detected subsequently to the turning-on of the IG switch 15 is set to be higher. Besides, the map has been set so that as the outside-air temperature becomes lower, the temperature correction value dT becomes higher. That is, in the case of low outside-air temperature, since there is a possibility that the temperature detection portion 64 may detect a temperature that is lower than the actual temperature, a high temperature correction value dT for the low outside-air temperature is set, so that the temperature detected by the temperature detection portion 64 is corrected to a higher value.

Besides, maps in which the current restriction value Ioff and the temperature correction value dT are associated with each other in correspondence may be provided separately for individual outside-air temperatures. Besides, although in FIG. 5, the temperature correction value dT is corrected according to the outside-air temperature, the temperature value obtained by adding the temperature correction value dT to the detected temperature T may be corrected according to the outside-air temperature.

The map shown in FIG. 6 associates the elapsed time t following the turning-on of the IG switch 15 and the percentage of the temperature correction value dT with each other in correspondence. The temperature correction value dT determined by a map shown in FIG. 5 is a value that occurs immediately after the IG switch 15 is turned on. The temperature correction value dT gradually decreases as time elapses after the IG switch 15 is turned on, as shown in the map of FIG. 6. For example, the temperature correction value dT at the elapse of 2 minutes following the turning-on of the IG switch 15 is about 60% of the temperature correction value dT that is determined from the map of FIG. 5. At the elapse of about 5 minutes following the turning-on of the IG switch 15, the temperature correction value dT becomes "0".

Figure 7:
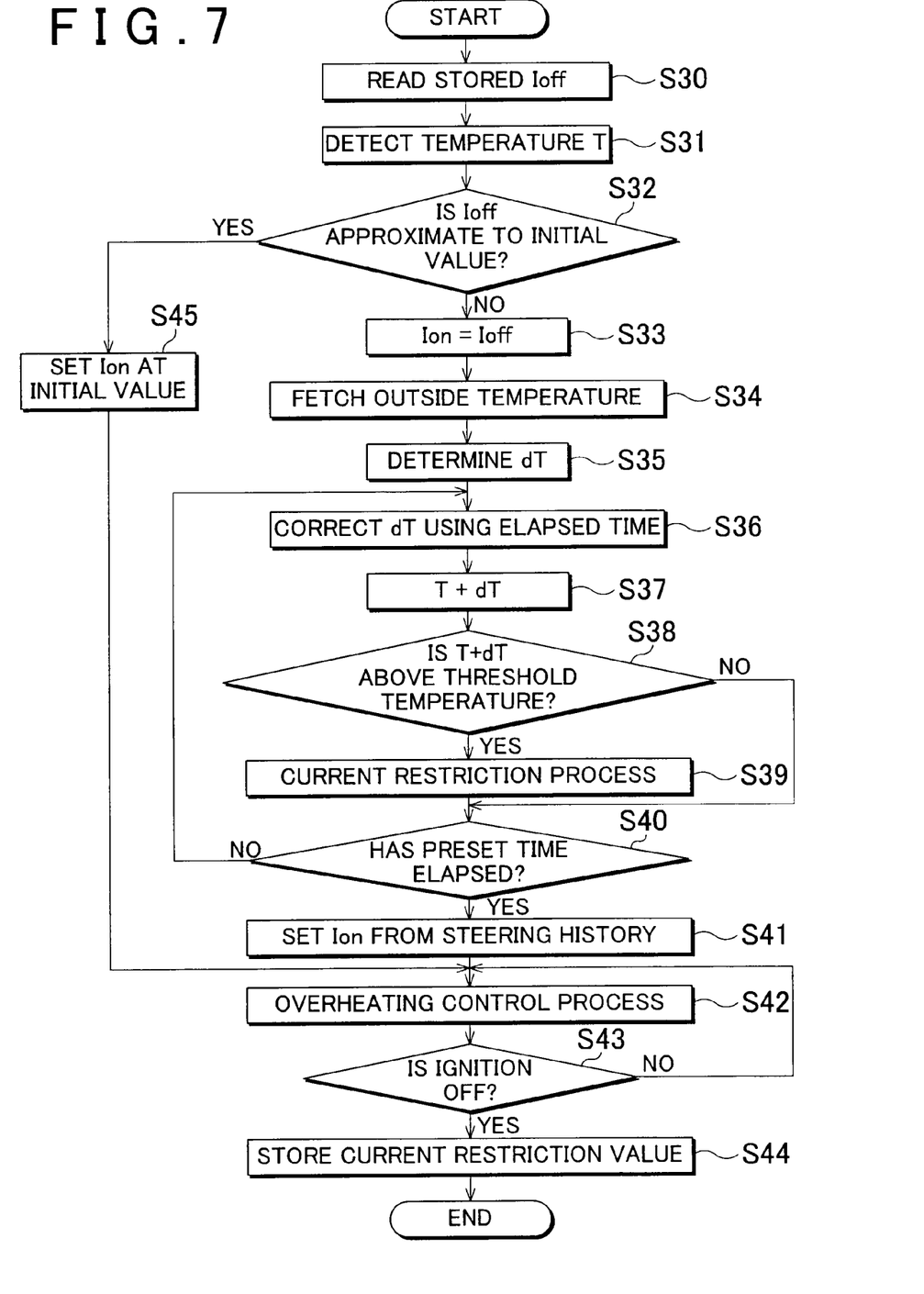
FIG. 7 is a flowchart for describing an operation that the assist control portion executes.

Next, an operation that the assist control portion 106 executes will be described. FIG. 7 is a flowchart for describing an operation that the assist control portion 106 executes.

When the IG switch 15 is turned on, the assist control portion 106 firstly reads the current restriction value Ioff stored in the storage portion 67 (S30). The current restriction value Ioff is stored in the storage portion 67 before the IG switch 15 is turned off. The assist control portion 106 detects the temperature T occurring in the assist control portion 106 by the temperature detection portion 64 (S31). Then, the assist control portion 6 determines whether or not the current restriction value Ioff is approximate to the initial value (S32). Herein, the initial value is the upper-limit value of the current restriction value, and the range of the approximation to the initial value is not particularly limited, but can be suitably changed. If the current restriction value Ioff is not approximate to the initial value (NO in S32), the assist control portion 106 sets the current restriction value subsequent to the turning-on of the IG switch 15 (hereinafter, termed the current restriction value Ion) to the current restriction value Ioff (S33). That is, immediately after the IG switch 15 is turned on, the assist control portion 106 executes the restriction of the motor current by using the current restriction value Ioff stored prior to the turning-on of the IG switch 15.

Subsequently, the assist control portion 106 fetches the outside-air temperature from the outside-air temperature detection portion 16 (S35). Then, the assist control portion 106 determines a temperature correction value dT by applying the current restriction value Ioff read in S30, the temperature T detected in S31, and the outside-air temperature fetched in S33, to the map shown in FIG. 5 (S35). After that, the assist control portion 106 corrects the temperature correction value dT determined in S34, by applying the elapsed time t following the turning-on of the IG switch 15 to the map shown in FIG. 6 (S36).

Next, the assist control portion 106 adds the temperature correction value dT to the temperature T detected in S31 (S37). Then, the assist control portion 106 determines whether or not the temperature value [T+dT] as a result of the addition in S37 is above a threshold temperature (S38). If the temperature value is not above the threshold temperature (NO in S38), the assist control portion 106 proceeds to S40. If the temperature value is above the threshold temperature (YES in S38), the assist control portion 106 executes a current restriction process control (S39). That is, if the target drive current value that the target drive current computation portion 62 has determined from various values, such as the vehicle speed value, the steering torque value, etc., is above the current restriction value Ion, the assist control portion 106 controls the target drive current value so as to become less than or equal to the current restriction value Ion. Then, on the basis of the result of the control, the assist control portion 106 generates a PWM signal to be given to the motor drive portion 7. Besides, if the target drive current value is not above the current restriction value Ion, the assist control portion 106 generates a PWM signal on the basis of the target drive current value computed by the target drive current computation portion 62.

In S40, the assist control portion 106 determines whether or not a predetermined time has elapsed following the turning-on of the IG switch 15 (S40). Immediately after the IG switch 15 is turned on, the temperature correction value dT is a value determined from the map of FIG. 5. Then, the temperature correction value dT gradually decreases as time elapses following the turning-on of the IG switch 15. Therefore, when the predetermined time (about 5 minutes in FIG. 4) has elapsed, the temperature correction value dT becomes "0". That is, when the predetermined time has not elapsed (NO in S40), the assist control portion 106 returns to S36, in which the assist control portion 106 corrects the temperature correction value dT on the basis of the elapsed time, by using the map of FIG. 6.

Thus, for the predetermined time following the turning-on of the IG switch 15, the detected temperature value is set high, so that the restriction of the motor current is executed by using a safe value. Therefore, the overheating of the motor 5 or the assist control portion 106 can be certainly prevented.

When the predetermined time has elapsed (YES in S40), the assist control portion 106 sets the current restriction value Ion having been set at the current restriction value Ioff in S33, on the basis of the steering history (S41). After that, the assist control portion 106 proceeds to S42. On the other hand, if it is determined that the current restriction value Ioff is approximate to the initial value (YES in S32), the assist control portion 106 determines that the restriction of the motor current was scarcely executed before the IG switch 15 was turned off. Then, the assist control portion 106 sets the current restriction value Ion set subsequently to the turning-on of the IG switch 15, to the initial value (S45). After that, the assist control portion 106 proceeds to S42.

In S42, the assist control portion 106 executes an overheat control process (S42). In the overheat control process herein, if the temperature T detected by the temperature detection portion 64 exceeds the threshold temperature, the assist control portion 106 prevents the overheating of the assist control portion 106 or the motor 5 by executing a control of restricting the motor current on the basis of the current restriction value Ion set in S41 or S45. In S42, the current restriction value Ion set in S41 or S45 is changed according to the steering history.

Next, the assist control portion 106 determines whether or not the IG switch 15 has been turned off (S43). If the IG switch 15 has not been turned off (NO in S43), the assist control portion 106 repeats the overheat control process in S42. On the other hand, if the IG switch 15 has been turned off (YES in S43), the assist control portion 106 stores the current restriction value used in the overheat control process in S42 into the storage portion 67 (S44), and then ends the operation process shown in FIG. 7. Incidentally, after the IG switch 15 is turned off, the complete shut-off of electric power is delayed, for example, by employing a timer or a relay, until the current restriction value is stored into the storage portion 67.

The current restriction value stored in S44 is read when the IG switch 15 is turned on, and then is used in the determination of the temperature correction value dT as described above.

As described above, the electric power steering device of the second embodiment restricts the current through the motor 5 on the basis of a temperature value that is higher than the detected temperature, for a predetermined time after the IG switch 15 is turned on. Therefore, even in the case where the detected temperature is not equal to the actual temperature of the motor 5, the safer control of current on the basis of a temperature value higher than the detected temperature will certainly prevent the trouble caused by overheating immediately after the IG switch 15 is turned on. Besides, because the temperature correction value dT is determined on the basis of the current restriction value set prior to the turning-off of the IG switch 15, the temperature correction value dT can be made appropriate, thus preventing the detected temperature from being corrected to a value that is higher than necessary.

Incidentally, in the second embodiment, the assist control portion 106 has the temperature detection portion 64, and determines a temperature correction value on the basis of the temperature in the assist control portion 106 detected by the temperature detection portion 64. However, it is also permissible to detect the temperature of the motor drive portion 7, or of another site whose temperature increases due to the driving of the motor 5, and to determine the temperature correction value dT on the basis of the detected temperature.

Besides, in the second embodiment, the timing at which the current restriction value is stored into the storage portion 67 is when the IG switch 15 is turned off. However, the current restriction value may also be stored into the storage portion 67 every time the current restriction portion 63 lowers the current restriction value on the basis of the steering history, that is, every time the current restriction value changes. In this case, the electric power supplied to the assist control portion 106 can be shut off simultaneously with the turning-off of the IG switch 15, so that there is no longer a need to install a relay for providing a time lag that allows the current restriction value to be stored after the IG switch 15 is turned off.

Besides, in the first embodiment, the current supplied to the motor 5 may be controlled by using the temperature value corrected by the temperature correction portion 68 described above in conjunction with the second embodiment, instead of using the temperature detected by the temperature detection portion 64.

While the preferred embodiments of the invention have been concretely described, the constructions, process operations, etc., thereof may be suitably changed, and are not limited to what has been described above in conjunction with the embodiments.

What is claimed is:

1. An electric power steering device comprising:
    a motor for steering assist that is supplied with a current in accordance with a steering torque applied to a steering member;
    a temperature detection portion that detects temperature of a specific site whose temperature increases due to driving of the motor;
    a control portion that controls the current to be equal to or less than a restriction value that is changed according to the temperature of the specific site, if the temperature detected by the temperature detection portion exceeds a threshold temperature;
    a temperature value storage portion that stores the temperature of the specific site when an engine is stopped;
    a restriction value storage portion that stores the restriction value provided when the engine is stopped, as a pre-stop restriction value;
    a computation portion that computes a temperature difference between the temperature of the specific site detected when a starter switch for starting the engine is turned on and the temperature stored when the engine is stopped;
    a setting portion that sets the restriction value to be equal to or greater than the pre-stop restriction value, based on the pre-stop restriction value, according to the temperature difference computed by the computation portion, over a predetermined time following a time of turning-on of the starter switch, if the temperature of the specific site at the time of the turning-on of the starter switch is above the threshold temperature.

2. The electric power steering device according to claim 1, wherein
    the setting portion comprises:
    a first setting portion that sets the restriction value to the pre-stop restriction value if the temperature difference computed by the computation portion is less than a first threshold value;
    a second setting portion that sets the restriction value to a value obtained by adding a predetermined value to the pre-stop restriction value if the temperature difference computed by the computation portion is equal to or greater than the first threshold value, and less than a second threshold value; and
    a third setting portion that sets the restriction value to an upper-limit value if the temperature difference computed by the computation portion is equal to or greater than the second threshold value.

3. The electric power steering device according to claim 2, further comprising:
    an outside-air temperature detection portion that detects outside-air temperature; and
    a determination portion that determines the first threshold value and/or the second threshold value based on the outside-air temperature detected by the outside-air temperature detection portion.

4. The electric power steering device according to claim 1, further comprising:
    a correction value determination portion that determines a temperature correction value that corrects the temperature of the specific site detected, based on the pre-stop restriction value, when the starter switch for starting the engine is turned on; and
    a temperature value setting portion that sets a temperature value obtained by adding the temperature correction value to the temperature of the specific site detected at a time of turning-on of the starter switch, as the temperature of the specific site, over a predetermined time following the turning-on of the starter switch,
    wherein the temperature detection portion uses the temperature value set by the temperature value setting portion as the temperature of the specific site.

5. The electric power steering device according to claim 4, further comprising
    a gradual decrease portion that gradually decreases the temperature correction value as time elapses after the starter switch is turned on.

6. The electric power steering device according to claim 4, further comprising:

an outside-air temperature detection portion that detects outside-air temperature; and a correction portion that corrects the temperature correction value and/or the temperature value set by the temperature value setting portion, based on the outside-air temperature detected.

7. An electric power steering device comprising:

a motor for steering assist that is supplied with a current in accordance with a steering torque applied to a steering member;

a temperature detection portion that detects temperature of a specific site whose temperature increases due to driving of the motor;

a control portion that controls the current to be equal to or less than a restriction value that is changed according to the temperature of the specific site, if the temperature detected by the temperature detection portion exceeds a threshold temperature;

a storage portion that stores the restriction value provided when an engine is stopped, as a pre-stop restriction value;

a determination portion that determines a temperature correction value that corrects the temperature of the specific site detected, based on the pre-stop restriction value, when the starter switch for starting the engine is turned on; and a temperature value setting portion that sets a temperature value obtained by adding the temperature correction value to the temperature of the specific site detected at a time of turning-on of the starter switch, as the temperature of the specific site, over a predetermined time following the turning-on of the starter switch.

8. The electric power steering device according to claim 7, further comprising:

a gradual decrease portion that gradually decreases the temperature correction value as time elapses after the starter switch is turned on.

9. The electric power steering device according to claim 7, further comprising:

an outside-air temperature detection portion that detects outside-air temperature; and a correction portion that corrects the temperature correction value and/or the temperature value set by the temperature value setting portion, based on the outside-air temperature detected.

* * * * *